Figure 1:
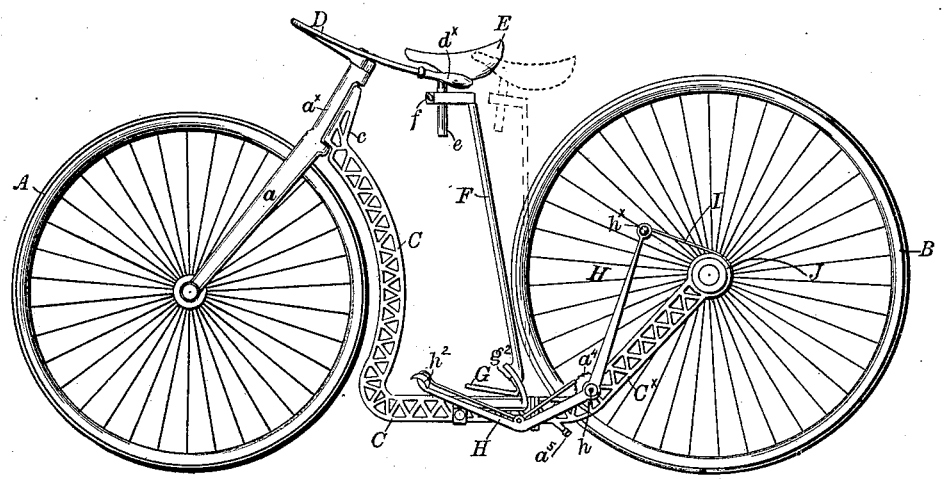

(No Model.) 3 Sheets—Sheet 1.

A. W. THOMAS.
VELOCIPEDE.

No. 422,548. Patented Mar. 4, 1890.

WITNESSES
R. B. Shepherd.
F. Norman Dixon.

A. W. Thomas
INVENTOR
By his Atty's
Wm. C. Strawbridge
J. Bonsall Taylor (No Model.) 3 Sheets—Sheet 2.
A. W. THOMAS.
VELOCIPEDE.
No. 422,548. Patented Mar. 4, 1890.
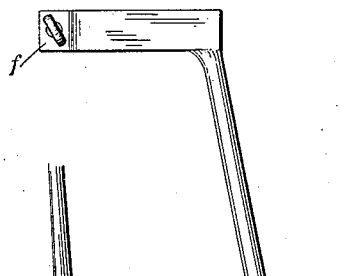
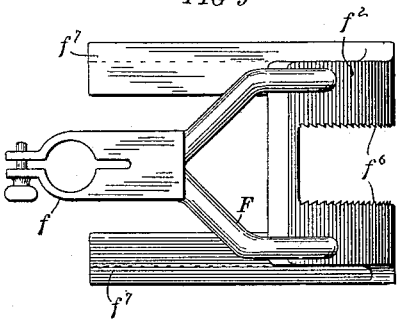
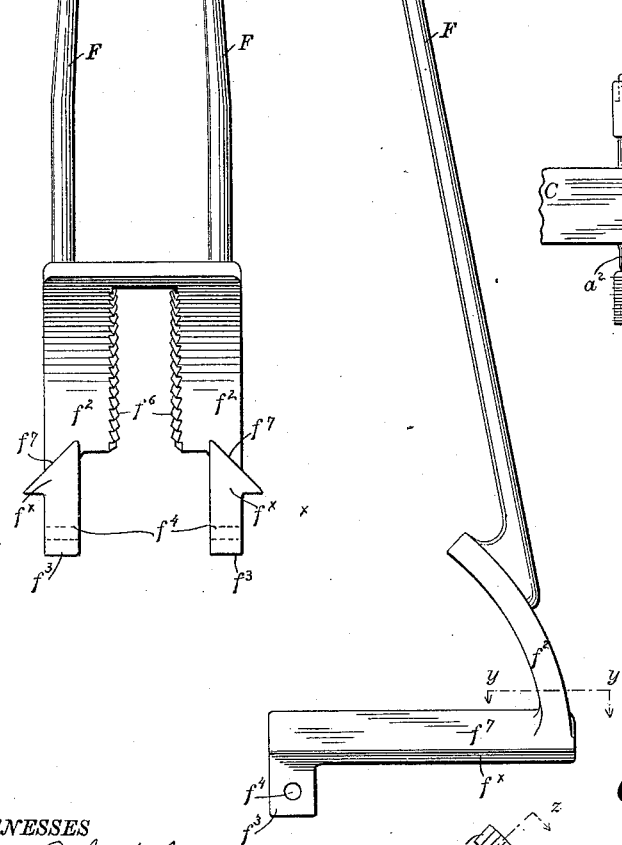
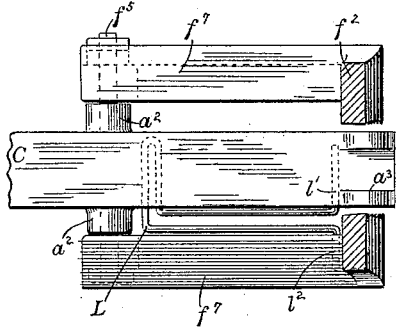
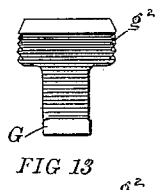
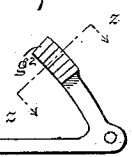

(No Model.) 3 Sheets—Sheet 3.

A. W. THOMAS.
VELOCIPEDE.

No. 422,548. Patented Mar. 4, 1890.

WITNESSES

A. W. Thomas
INVENTOR

UNITED STATES PATENT OFFICE.

AMOS WORTHINGTON THOMAS, OF PHILADELPHIA, PENNSYLVANIA.

VELOCIPEDE.

SPECIFICATION forming part of Letters Patent No. 422,548, dated March 4, 1890.

Application filed June 7, 1888. Serial No. 276,374. (No model.)

*To all whom it may concern:*

Be it known that I, AMOS WORTHINGTON THOMAS, a citizen of the United States, residing at the city of Philadelphia, in the county of Philadelphia and State of Pennsylvania, have invented certain new and useful Improvements in Bicycles and other Vehicles, of which the following is a specification.

My invention is primarily applicable to bicycles known as "Safety" machines, provided with two road-wheels of approximately the same size and diameter, in which the feet of the rider are always in close proximity to the ground.

The principal objects of my invention are to construct a Safety bicycle in which the front wheel is preferably the pilot or steering wheel and the rear one the driving-wheel, in which pedal or treadle levers actuate clutches on the driving-wheel, instead of pedal-driven cranks; furthermore, to provide a machine which may be readily mounted and dismounted, especially if the rider is a woman, to which end the backbone thereof is formed saddle-shaped—that is, from the steering-head preferably curved downwardly at an arc concentric to the felly of the pilot-wheel to a point near the ground, whence it is extended backward horizontally, and thence upward at an angle of forty-five (45°) degrees, more or less, to the hub of the driving-wheel; furthermore, to provide a machine in which due provision is made for the adjustment of the saddle or seat of the rider backward or forward from a central point more or less directly over the pedals or treadles, the saddle being mounted upon a swinging spring-support, so as to be capable of a slight forward and backward vibratory movement in the operation of the machine; furthermore, to provide a machine in which provision is made for maintaining the pedals or treadles depressed in given adjusted positions, and handle-bars disposed so as to partially encircle the rider and permit of his standing erect over the pedals or treadles, with the handles thereof in a perpendicular line, or approximately so, above the same, and, furthermore, to provide a machine with frame-work strong, light, and ornamental.

The nature and characteristic features of my invention will be more fully understood by reference to the accompanying drawings, forming part hereof, in which—

Figure 2:
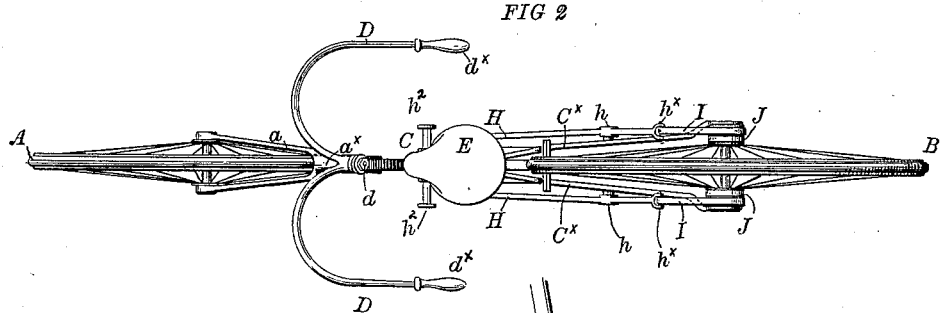
Figure 3:
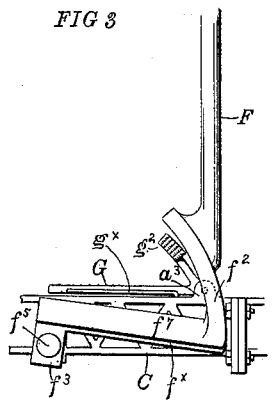
Figures 4, 5:
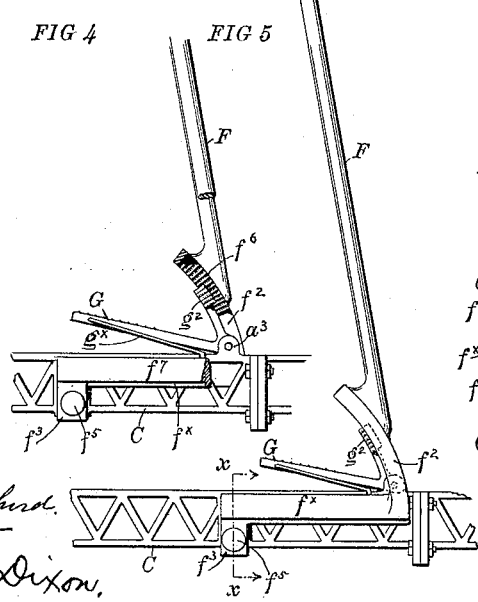
Figure 6:
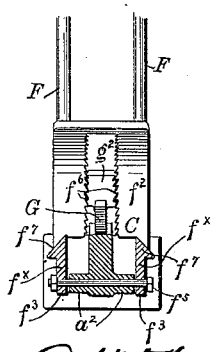
Figure 14:
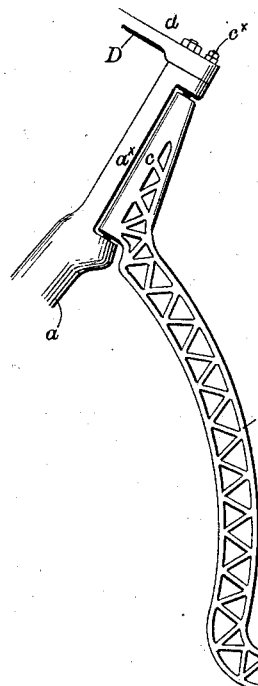
Figure 15:
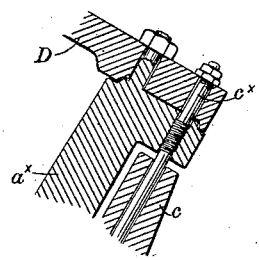
Figure 16:
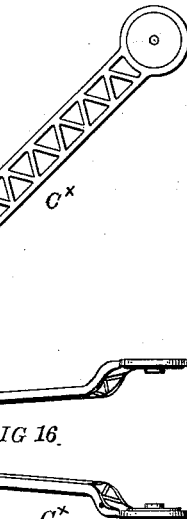
Figure 17:
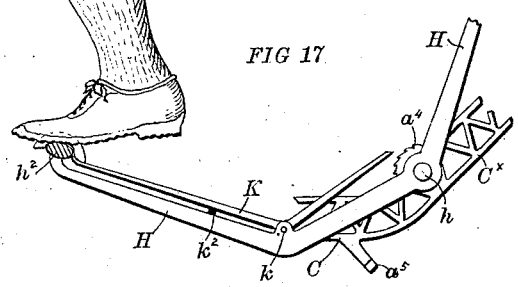
Figure 19:
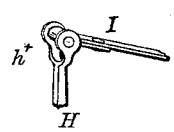
Figure 18:
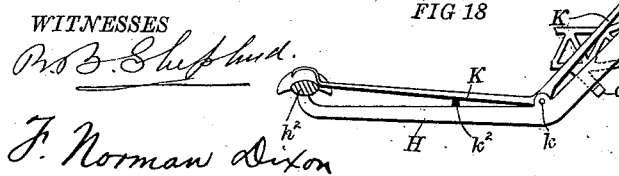

Figure 1 is a side elevation of a bicycle embodying the characteristic features of my invention. Fig. 2 is a top or plan view thereof. Figs. 3, 4, and 5 are side elevational details of the base of the adjustable saddle-support and the devices for maintaining said support in given adjusted positions. Fig. 6 is in part a sectional end elevation on the line $x\ x$ of Fig. 5. Fig. 7 is a front end elevation of a portion of the saddle-support and the segmental locking-seat and base-bars of said support. Fig. 8 is a side elevation of the saddle-support. Fig. 9 is a top or plan view of said support. Fig. 10 is a top or plan as well as a sectional view on the line $y\ y$ of Fig. 8, showing the base-bars of said support and a portion of the main frame. Fig. 11 is a side elevation of the key for locking the saddle-support. Fig. 12 is an end elevation of the lock illustrated in Fig. 11. Fig. 13 is a transverse sectional plan through the lock on the line $z\ z$ of Fig. 11. Fig. 14 is a side elevation of the backbone or main frame and steering-head. Fig. 15 is a vertical sectional elevation in detail of a portion of the steering-head, trunnion of the backbone, and handle-bar, designed to illustrate a preferred mode of connection. Fig. 16 is a top or plan view of the rear fork of the main frame and a portion of the horizontal extension of said frame. Fig. 17 is a side elevation in detail of one of the pedal or treadle levers in action. Fig. 18 is a similar view of the said lever locked in its depressed position, and Fig. 19 is a perspective detail of a pivot-connection between the pedal or treadle lever and its strap.

Referring now to the drawings, A represents the steering or pilot wheel, and B the driving-wheel.

$a$ are the front forks, which terminate, as usual, in the steering-head $a^x$, of any preferred construction.

C is the main frame or backbone, the trunnion $c$ of which is fitted to the steering-head $a^x$ by means of the pin $c^x$, as shown in Figs. 14 and 15. From the base of the trunnion $c$ the backbone preferably follows the curvature of the pilot-wheel—that is, assumes the shape of an arc whose center is the axis of the pilot-wheel to a point near the ground, whence it extends backward horizontally, as shown in Figs. 1 and 14, and from the rear thereof it is provided with an angular upward extension formed into a fork $C^\times$, which embraces the driving-wheel B. The rear fork $C^\times$ may be forged or otherwise formed integral with the other parts of the backbone C; or it may be bolted thereto, as shown in Figs. 14 and 16. The entire backbone, made saddle-shaped and lower at its central than at its extremital portions, is preferably constructed of a light skeleton brace or truss of considerably greater depth than breadth, with open-work, as indicated in the drawings, and while strong and light presents as well an ornamental appearance. The front forks $a$ may, if desired, be also made with the open-work, and to such extent be similar to the rear forks $C^\times$.

D is the handle-bar attached to the steering-head $a^\times$ by means of a bolt $d$, as shown in Figs. 2, 14, and 15, or in any other preferred manner. This handle-bar is doubly curved, as shown in Figs. 1 and 2—that is, each side curves gracefully forward, forming a semicircular arc, and each outer extremity extends in a direct or angular line backward some distance to its handles $d^\times$, which latter occupy positions when the pilot-wheel is in line with the driving-wheel B abreast on each side of the saddle E while in its normal position.

By constructing the cross handle-bar in the manner just described, with side handles located a suitable distance above the pedal-levers, the rider is enabled to stand erect to operate the pedals, as well as to pull and bear with freedom on said handles while so standing upon said pedals—that is to say, in a position whereby the greatest amount of power may be exerted in the propelling of the vehicle. When rounding sharp curves, one of the handles may be said to partially encircle the rider, so that by an abrupt turning of the pilot-wheel A one handle will pass to the rear of the seat E of the vehicle. The knees of the rider will at all times assume positions beyond the center of the axis of said handle-bar in the upward stroke of the pedal or pedals.

E is the saddle, of any preferred construction, with a depending saddle-bar $e$, adapted to be clamped at the desired height in a clamp $f$ on the upper extremity of the saddle-support.

The saddle-support, Figs. 1, 3, 4, 5, 6, 7, 8, 9, and 10, is composed, essentially, of two spring-rods, to which the letter F is applied, which, to prevent sidewise action, are laterally spread apart from their upper portion, where they unite to support the saddle-clamp to the extremities thereof when united with or merged into a segmental internally-locking seat $f^2$ of the form shown in the drawings. This locking-seat in turn springs from and is part of the rear portion of a pair of base-bars $f^\times$, preferably of the form shown in the drawings, provided at their forward extremities with depending cheek-pieces $f^3$, traversed by transverse holes $f^4$, and adapted by means of a pin $f^5$ to be pivotally connected with a tubular box $a^2$, Figs. 6, 10, 14, and 16, formed on the horizontal portion of the main frame.

L, Fig. 10, is a torsion-spring between the backbone and one of the base-bars of the saddle-support, the right-angular twist of which spring lies below the upper surface of and is entered between braces in the backbone, and the free extremities $l'$ and $l^2$ of which enter a hole formed in the backbone and another hole formed in one of the base-bars. The normal action of this spring is to elevate the rear portion of the base-bars of the saddle-support, and thereby tend to throw the same forward. Of course, if desired, the spring may have a reverse twist to that above given, in order that it may have given to it the capacity of normally throwing the saddle-support backward instead of forward.

As will be apparent, the saddle-support and saddle are adapted to be rocked forward and backward with respect to the tubular box and its pin acting as a fulcrum. The base-bar and segmental ratcheted seat preferably straddle the horizontal portion of the main frame C.

G is a locking-lever normally held up by the spring $g^\times$, pivoted by means of the pin $g$ between two ears $a^3$, formed at the upper part of the horizontal portion of the main frame. This lever is provided with an angular toothed locking-key $g^2$, adapted to engage with the inner toothed faces $f^6$ of the segmental locking-seat, and by such engagement, which is maintained by the action of the spring $g^4$, Fig. 4, retain the saddle-support F and saddle E in any preferred adjusted position. This adjustment of the seat is effected by the depression of the lever, so as to compress its spring and disengage the key from the toothed faces of the locking-seat by the subsequent adjustment of the saddle by the movement of the rider upon it or by hand before mounting, while the locking-lever is still held depressed, and by the final release of said lever, so as to, under the influence of its spring, secure the engagement of the teeth of the locking-key with the toothed face of the seat of the saddle-support in the then position of adjustment of said locking-seat and support.

It will be observed that the base-bars of the saddle-support have outwardly and downwardly inclined or flaring faces $f^7$, as shown more particularly in Figs. 7 and 8, and this is simply to deflect the heel of the rider from off the base-bars should his feet in the act of pedaling encounter it.

The above-described application of the saddle not only permits of its forward and backward adjustment, but in effect provides a spring foundation for the saddle, and at the same time places the adjustment thereof completely under the control of the rider either before or after mounting. The forward and backward adjustment is especially advantageous in descending as well as mounting on hills.

The locking of the seat in position is of course automatic upon the release of the locking-lever under the stress of its spring. The vertical adjustability of the seat, in connection with the above adjustability forward and backward thereof, renders it possible for the rider to meet the minimum force upon the pedals or treadles, while the springing action of the saddle-support insures diminution of sudden strain or shock in the passage of the vehicle over obstructions in the roadway.

H are the pedal-levers, of the general character employed in clutch and strap machines. Each of these levers is pivoted at $h$ to the outside of the rear fork of the frame-work, its rearwardly-extending extremity rising upward from the treadle-pivot and having a pivotal connection $h^x$, Fig. 19, by which it is connected with the clutch-strap I or other suitable clutch-connections. The respective clutch-straps act upon independent clutches J, applied to the axle and hub of the rear or driving wheel B. While these clutches J may be of any desired construction, I, however, prefer to employ a clutch of my invention, constituting the subject-matter of an application for a patent filed by me in the Patent Office under date of June 12, 1888, and serially numbered 276,839.

The forward extremity of each pedal-lever terminates in the pedal foot-piece $h^2$ of any preferred form, and said forward extremity is preferably given a bent or angular shape, as illustrated in Figs. 17 and 18. Against the upper face of each pedal-lever is pivoted at $k$ what I term a "pedal-lock" K. This lock corresponds in general shape with the forward portion of the pedal-lever H, and is provided at its forward extremity with a locking-head $k^x$, Figs. 17 and 18, which, when depressed by the foot, closely covers and seats itself upon the pedal foot-piece $k^2$, in connection with which it operates. Beneath the forward part of the pedal-lock, and between it and the outer arm of the pedal-lever, is interposed a pedal-locking spring $k^3$, which ordinarily serves to keep the pedal-lock in the position indicated in Fig. 18. In this position the rear extremity of said pedal-lock, constituting, in effect, a pawl, is adapted to engage with a fixed ratchet $a^4$ upon the rear fork of the frame-work. This entire contrivance is intended to maintain in position the pedal-lever to which it is applied, one of these devices being of course applied to each lever in any desired depressed position, and so as to be below the level or clearance of the horizontal portion of the backbone of the machine, with this result, that said horizontal portion can be used as an unobstructed step in mounting and dismounting. This treadle-locking device has the further advantage of being automatic in its action in preventing the sudden flying up of the pedal-lever upon the sudden lifting or slipping of the foot from off the same. Such automaticity of action is due to the recoil of the pedal-locking spring $k^2$, (which instantly under the above movements or the gradual side movement of the foot to clear the pedal-lock tread, but not the side of the pedal foot-piece,) acts automatically to cause the engagement of the pedal-lock with its ratchet, and consequently effecting the stoppage of the further rise of the pedal-levers. Of course as long as pressure is exerted upon the pedal-lock tread the lock itself is maintained clear of the ratchet, and this lock is therefore without effect upon the pedal-lever in the ordinary running or driving of the machine.

$A^5$, Figs. 14, 16, and 18, are stops for the pedal-levers, being projections from the respective sides of the rear fork $C^x$, which serve to prevent the depression of the treadle-levers beyond the desired point—for instance, beyond the position represented in dotted lines in Fig. 14—and permit the rider to stand upon the pedals clear of the saddle.

In respect to my present invention it may be remarked that in many details of construction alterations may be made without departing from the true spirit thereof, and, furthermore, that it is obvious that many of the devices hereinbefore described are susceptible of use in connection with tricycles, four-wheeled velocipedes, and other vehicles.

Having thus described the nature and objects of my invention, what I claim as new, and desire to secure by Letters Patent, is—

1. In a bicycle or velocipede, a pilot-wheel provided with a steering-head, and a skeleton open-work backbone pivotally connected therewith and conforming to the curvature of the pilot-wheel to near the ground, and extending rearward and terminating in a forked extension connected with the hub of the driving-wheel, as shown and described.

2. In a bicycle or velocipede, the combination, with a main frame or saddle-shaped backbone lower at its central than at its extremital portions, and an adjustable support with a saddle at its upper extremity, and said support pivotally connected with said main frame at a point approximately central to said extremities in a line beneath said saddle and capable of adjustment to the front or rear of the pivotal connection with said main frame, of a handle-bar extending backward to the sides of said saddle, substantially as described.

3. The combination of a bicycle or velocipede provided with a front pilot-wheel and a rear driving-wheel, a saddle-shaped backbone lower at its central than at its extremital portions, a spring saddle-support pivoted in a line below the saddle carried thereby to a point central to said backbone, and a double curved bar having handles extending rearward to the sides of said saddle, pedals, levers, clutches, and straps, all arranged substantially as described.

4. The combination of a bicycle or velocipede provided with pilot and driving wheels, and a backbone lower at its central than at its extremital portions, an adjustable support with the upper extremity provided with a saddle and having its lower extremity pivotally attached to said backbone in a line below said saddle and capable of adjustment longitudinally in either direction therefrom, and a key for locking said support in given adjusted positions, substantially as described.

5. The combination, with a backbone with fixed ratchets, of treadle-levers pivoted to said backbone and pedal-locks pivoted to said levers, substantially as and for the purposes set forth.

6. In a bicycle or velocipede, the combination, with the main frame made saddle-shaped or lower at its central than at its extremital portions, of an adjustable support pivoted to said main frame and capable of adjustment both forward and backward, a double curved handle-bar with the handle portions extending backward to the sides of the saddle, pedal-levers pivoted to said main frame, clutches applied to the hubs of the driving-wheel, and straps connecting the pedal-levers with said clutches, substantially as and for the purposes set forth.

7. In a bicycle or velocipede, the combination, with a main frame lower at its central than at its extremital portions, and a support equipped with a saddle, and said support pivoted to said frame, of a handle-bar extending from its center forward and outward and then backward to the sides of said saddle, substantially as described.

8. The combination, with a bicycle or velocipede having a front pilot-wheel with a steering-head, a main frame with a saddle pivotally supported above the same, and a rear driving-wheel embraced by the forked portions of said main frame, of a double handle-bar, the main portions of which extend forward of the axis of said steering-head and the handles thereof rearward to the sides of said saddle while in normal positions, substantially as and for the purposes set forth.

9. The combination, with a bicycle or velocipede, of a handle-bar extending forward of its axis, and the handles thereof extending to the sides of the saddle and in a line approximately perpendicular to the pedals of the vehicle, substantially as shown and described.

10. The combination of a bicycle or velocipede provided with a double handle-bar extending from a central point forward and curving outward and thence backward to a point above approximately perpendicular to the pedals and in line with the saddle of the vehicle, substantially as described.

11. In a bicycle or velocipede, the combination, with a skeleton backbone lower at its central than at its extremital portions, of a spring saddle-support pivotally connected with said backbone and equipped with a saddle, and a device for locking said support in different positions, substantially as shown and described.

12. In a bicycle or velocipede, the combination, with a backbone, a support equipped with a saddle, pedal-levers pivoted to said backbone, and stops supported by said backbone, of a double handle-bar curving outward from its axis and rearward to the sides of the saddle, substantially as shown and described.

13. In a bicycle or velocipede, the combination, with a backbone, a spring-support pivotally connected therewith and equipped with a saddle, and pedal-levers pivoted to said backbone, of a double handle-bar curving forward and outward from its axis and thence rearward and downward to the saddle, substantially as and for the purposes described.

14. In a bicycle or velocipede, the combination, with pedal-levers, of a steering-bar secured to or formed integral with the steering-head, and extending therefrom on opposite sides of the axial line of said steering-head and longitudinally as far as the sides of a saddle, whereby in action the said steering-bar is afforded a radius of movement greater than the distance from the axis of the steering-head to the center of the saddle and sufficient to clear the rider seated on the saddle, substantially as shown and described.

15. In a bicycle or velocipede provided with pedal-levers and clutches for actuating the driving-wheel of the vehicle, a bar extending outward from the steering-head of the pilot-wheel and provided with handles extending downward as far as the sides of the saddle, whereby said bar may be readily operated by the rider while seated on the saddle with the feet in engagement with said levers, substantially as shown and described.

16. In a bicycle or velocipede, the combination, with pedal-levers, of a steering-bar secured to or formed integral with the steering-head and extending therefrom on each side of its axial line, forming portions which are on opposite sides of the axial line from the handles of said steering-head and extending as far as the sides of the rider, all arranged substantially as shown and described, to permit the said handles to pass beyond the rider.

In testimony whereof I have hereunto signed my name this 5th day of June, A. D. 1888.

AMOS WORTHINGTON THOMAS.

In presence of—
J. BONSALL TAYLOR,
F. NORMAN DIXON.